Jan. 21, 1969     B. E. STEWART     3,423,036
FOOD WASTE DISPOSER
Filed Dec. 16, 1966
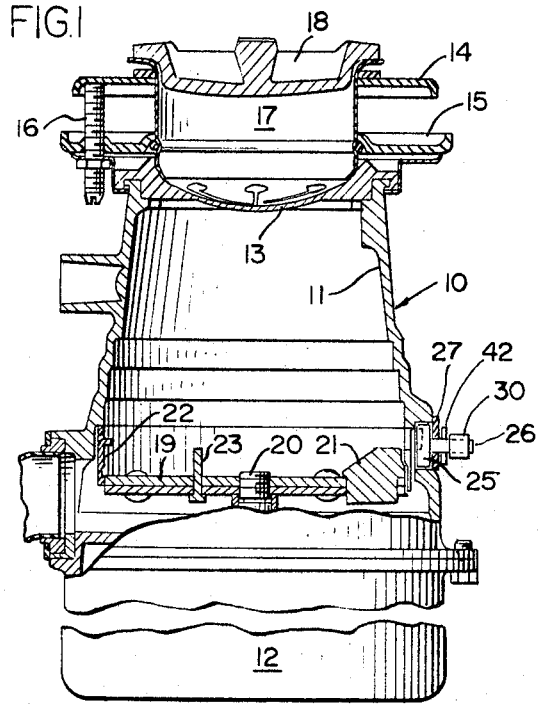
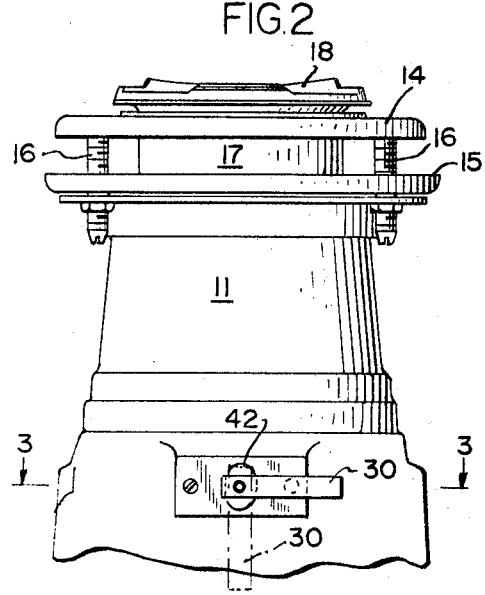
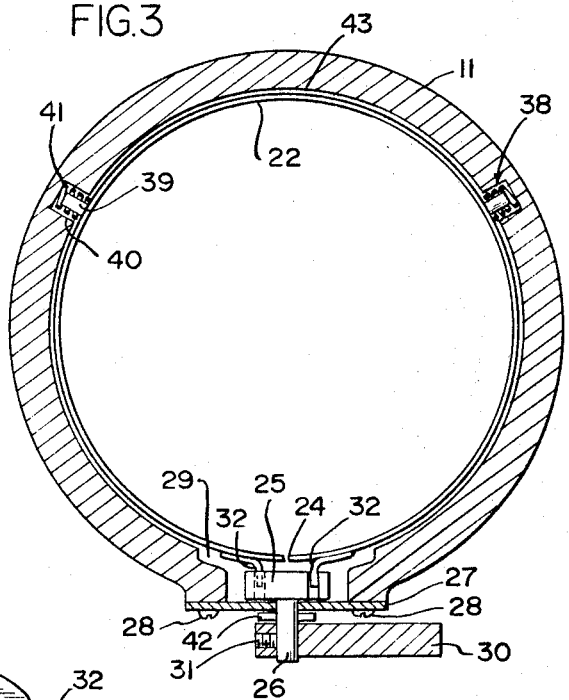
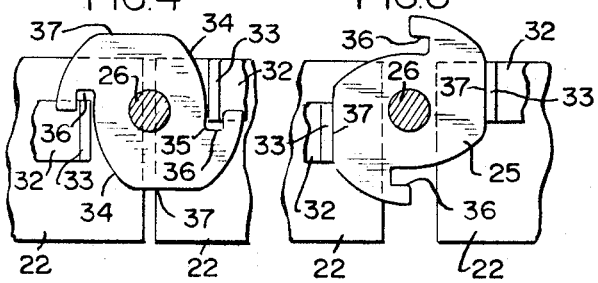
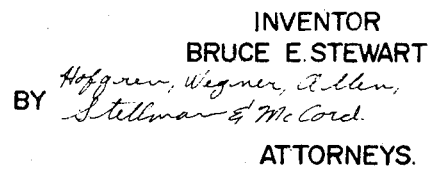
INVENTOR
BRUCE E. STEWART
BY *Hofgren, Wegner, Allen,*
*Stellman & McCord*
ATTORNEYS.

United States Patent Office 3,423,036
Patented Jan. 21, 1969

3,423,036
FOOD WASTE DISPOSER
Bruce E. Stewart, St. Paul, Minn., assignor to Whirlpool Corporation, a corporation of Delaware
Filed Dec. 16, 1966, Ser. No. 602,217
U.S. Cl. 241—100.5               15 Claims
Int. Cl. B02c *13/02*

ABSTRACT OF THE DISCLOSURE

A food waste disposer having a split shredder ring with means such as cam means for moving the shredder ring as by spreading it when the disposer becomes jammed. The cam means may also serve to lock the shredder ring in its grinding position under normal operation.

---

This invention relates to a food waste disposer of the type adapted to receive food waste from a kitchen sink and to grind the waste into particles small enough to be flushed into a sewer.

Food waste disposers of the above type ordinarily include a hopper into which the waste is flushed from a sink with the hopper containing a motor driven rotatable grinding member that is surrounded by a fixed or stationary grinding member so that the waste will be ground between the rotating member and the fixed member. One of the serious problems with such a disposer is that sometimes large masses of food waste, particularly of waste that is difficult to grind such as bones, become jammed between the rotatable and fixed grinding members with the result that the disposer is jammed. It is frequently difficult to unjam the disposer so that it can resume its normal grinding.

One of the features of this invention is to provide a disposer having improved means for unjamming the disposer comprising a rotatable first grinding member means in the hopper, a second grinding member means surrounding and cooperating with the rotatable member for grinding waste on rotation of the rotatable member and means for moving the fixed second grinding member away from the first member, when desired, to release waste caught or jammed between the members.

Other features and advantages of the invention will be apparent from the following description of one embodiment thereof taken in conjunction with the accompanying drawings. Of the drawings:

FIGURE 1 is a side elevational view partially in vertical section through a food waste disposer embodying the invention.

FIGURE 2 is a fragmentary side elevational view of the upper part of the disposer of FIGURE 1 as viewed from the right of FIGURE 1.

FIGURE 3 is a horizontal sectional view taken substantially along line 3—3 of FIGURE 2.

FIGURE 4 is a detail front elevational view of the locking cam portion of this embodiment.

FIGURE 5 is a plan view of the structure of FIGURE 4 showing in addition thereto the adjacent portions of the fixed grinding member.

FIGURE 6 is a view similar to FIGURE 4 but showing the locking cam portion in position with the grinding member expanded.

FIGURE 7 is a view similar to FIGURE 5 but also showing the grinding member expanded.

In the embodiment shown in the accompanying drawings the food waste disposer 10 comprises an upper hopper 11 and a lower motor casing 12 in which an electric motor (not shown) is contained for driving the rotatable grinding member. As is customary, the top of the hopper 11 is provided with a displaceable resilient closure 13 that permits entry of food waste into the hopper 11 but retards ejection of the waste in a reverse direction. The top of the hopper also includes the usual attaching flanges 14 and 15 and expansion screws 16 for attaching the disposer to an ordinary sink (not shown) in the customary manner so that food waste can flow from the sink through a conduit 17 which is closable by a removable closure 18.

Positioned within the hopper 10 is a rotatable first grinding member means or circular plate 19 that is rotatable by means of a central motor driven shaft 20. This plate carries at its periphery a grinding element 21 that cooperates with a second grinding member means 22 that is in the form of a ring surrounding the periphery of the circular plate 19. The plate also carries a customary upwardly extending projection 23 to break up masses of waste that may tend to gather at the axis of the shaft 20 which of course is the axis of rotation of the plate 19.

In disposers of this type it frequently happens that masses of difficult to grind food waste jam between the grinding element 21 and the ring 22. When this occurs, it has been past practice to stop the disposer and attempt to remove the jammed waste by reaching in through the top of the hopper 11 by displacing the closure 13. This is at best a difficult operation. The present invention includes improved means for releasing the jammed waste.

In this invention the release of the jammed waste is accomplished by including means for moving the second grinding member or ring 22 away from the first member or plate 19 with its grinding element 21. This movement promotes the release of any waste that is caught between the grinding members.

In the illustrated embodiment this moving of the ring 22 is accomplished by making the ring of resilient material such as steel and providing a split 24 in one section thereof. The means for moving the ring is located at this split and operates to flex the ring away from the plate 19.

In the illustrated embodiment the means for flexing the ring comprises a cam means including a cam 25 arranged adjacent the section of the ring containing the split 24 and substantially parallel to but spaced from a tangent to the ring at the split. The cam 25 is provided with an outwardly projecting shaft 26 that extends outwardly through a mounting plate 27 that is fastened to the hopper 11 by bolts 28 to extend across a cavity 29 that contains the cam 25. The outwardly projecting shaft 26 has attached to it a manipulating handle 30 on the exterior of the hopper 11 as by means of a set screw 31.

In order to spread the grinding ring 22 at the split 24 there is provided a pair of cam followers 32 on opposite sides of the split 24. Each cam follower includes an outwardly projecting end 33 adapted to be contacted by a cam surface 34.

Adjacent the innermost end 35 of each cam surface 34 is a cavity 36 which functions as a lock means each engaging a cam follower 33 in locking the ring 22 in fixed grinding position adjacent the rotatable plate 19 so that the disposer can function in its normal manner. This position of the cam followers 33 and the cam 25 is illustrated in FIGURES 3–5. As is shown in FIGURE 5, in this position the split 24 is narrow.

Whenever jamming occurs, the handle 30 is turned from its horizontal position shown in solid lines in FIGURE 2 to its down position shown in broken lines in this same figure. When this occurs, the cam 25 and cam followers 33 are moved to the positions shown in FIGURES 6 and 7. This flexes the grinding ring 22 outwardly away from the periphery of the plate 19 and toward the adjacent inner surface of the hopper 11. Because of this movement the jamming waste is readily removed upon rotation of the plate 19. If removal of the jamming waste is difficult it can often be removed by flexing the ring 22 toward and away from the periphery of the rotating plate 19 by oscillating the exterior handle 30.

In order to hold the ring 22 in outwardly flexed position when such is desired the cam 25 is provided with lock means here shown as the oppositely located flat surfaces 37 for retaining the cam followers 33 spread apart as shown in FIGURE 6.

In order to hold the ring 22 securely when in its normal grinding or unflexed position, there are provided yieldable means spaced from the split 24 for yieldably supporting the ring. It is preferred that a plurality of the yieldable means 38 be provided located at positions spaced from the split 24 and preferably symmetrically arranged relative to the split. In the illustrated embodiment each yieldable means 38 comprises an outwardly projecting pin 39 each received in a socket 40 and surrounded by a yieldable member such as the illustrated spring 41 located in the socket 30. In the illustrated embodiment, there are provided a pair of the yieldable means spaced from and symmetrical to the split 24.

In operation the grinding ring 22 is located in the position shown in FIGURES 1 and 3–5 by arranging the handle 30 in its horizontal position at which time the ring 22 is closely adjacent the periphery of the rotatable plate 19 as is customary in disposers of this type. When so arranged, the ring is securely supported by the yieldable means 38 and each cam follower 33 engaging its locking cavity 36 as shown in FIGURE 4. Then, in the event of jamming of hard difficult to grind waste between the grinding members 19 and 22, the ring 22 can be flexed outwardly away from the periphery of the plate 19 by moving the handle 30 to its downwardly projecting position as shown in dotted lines in FIGURE 2. This not only flexes the ring 22 toward the inner surface of the hopper 11 but also permits a small amount of vertical motion in the ring about the pins 39. Customarily, such outward flexing of the ring loosens the jammed waste material so that rotation of the plate 19 can be resumed. In the event such release does not occur, however, the ring can be flexed inwardly and outwardly by moving the handle 30 between its solid and broken line positions of FIGURE 2.

The handle 30 provides actuating means for flexing the ring 22 exteriorly of the hopper so that it is unnecessary to enter the hopper as is customary now to unjam the grinding members. The handle is illustrative of mechanical means for flexing the ring, although electrical such as solenoid operated means may be used if desired.

In the illustrated embodiment a visual indicator plate 42 is positioned between the handle 30 and the mounting plate 27 as an aid in indicating the relative flexed position of the ring 22.

In the preferred construction the normal unflexed position of the ring 22 as shown in FIGURE 3 places the ring as close as possible to the inner surface 43 of the hopper 11 while maintaining enough room for outward flexing of the ring to its maximum extent.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A food waste disposer, comprising: a hopper for receiving said waste; a rotatable first grinding member means in said hopper; a second grinding member means comprising a ring surrounding and cooperating with said rotatable member for grinding said waste; and means for moving said second grinding member ring away from said first member when desired to release waste caught between said members.

2. The disposer of claim 1 wherein said means for moving is provided with actuating means exteriorly of said hopper for moving said second grinding member toward and away from said rotatable first grinding member during rotation thereof as an aid in releasing said waste.

3. The disposer of claim 1 wherein said means for moving includes means for selectively fixing said second grinding member in said position surrounding said rotatable grinding member.

4. The disposer of claim 1 wherein said means for moving includes means for releasably maintaining said first grinding member in said position away from said rotatable grinding member.

5. The disposer of claim 1 wherein said means for moving includes means for selectively fixing said second grinding member in said position surrounding said rotatable grinding member and means for releasably maintaining said first grinding member in said position away from said rotatable grinding member.

6. The disposer of claim 1 wherein the ring of said second grinding member is resilient and has a section containing a split with said means for moving being located at said split to flex the ring in providing said moving.

7. The disposer of claim 6 wherein said means for moving comprises cam means at said split section and a cam follower on said ring in contact with said cam means.

8. The disposer of claim 7 wherein there are provided a rotatable cam comprising said cam means located at said section and adjacent said split having oppositely located cam surface means, and a pair of cam followers attached to said ring on opposite sides of said split and in contact with said surface means for spreading said ring on rotation of said cam.

9. The disposer of claim 8 wherein said cam is provided with lock means adapted to engage said cam followers for selectively fixing said second grinding member in said position surrounding said rotatable grinding member.

10. The disposer of claim 6 wherein yieldable means are provided spaced from said split for yieldably supporting said ring.

11. The disposer of claim 10 wherin a plurality of said yieldable means are provided each comprising an outwardly projecting member on said ring received in means forming a socket in said hopper and a yieldable member between said projecting member and said socket means.

12. The disposer of claim 10 wherein a plurality of said yieldable means are provided symmetrically arranged with respect to said split.

13. The disposer of claim 7 wherein there are provided a rotatable cam comprising said cam means located at said section and adjacent said split having oppositely located cam surface means, a pair of cam followers attached to said ring on opposite sides of said split and in contact with said surface means for spreading said ring on rotation of said cam, lock means on said cam adapted to engage said cam followers for selectively fixing said second grinding member in said position surrounding said rotatable grinding member, and a pair of yieldable means each comprising an outwardly projecting member on said ring received in means forming a socket in said hopper and a yieldable member between said projecting member and said socket means, said pair being symmetrically arranged with respect to said split.

14. The disposer of claim 13 wherein there are provided actuating means for rotating said cam exteriorly of said hopper for flexing said ring toward and away from said rotatable first grinding member during rotation thereof as an aid in releasing said waste.

15. The disposer of claim 13 wherein said cam includes surface means for engaging said cam followers and maintaining said ring away from said rotatable grinding member against the urging of said yieldable members.

References Cited

UNITED STATES PATENTS

| | | | |
|---|---|---|---|
| 2,012,680 | 8/1935 | Hammes | 241—46 |
| 2,156,075 | 4/1939 | Alexay | 241—46 |
| 2,166,786 | 7/1939 | Alexay | 241—46 |
| 2,185,037 | 12/1939 | Powers | 241—46 |
| 2,603,328 | 7/1952 | Jordan | 241—46 |
| 2,846,155 | 8/1958 | Higer | 241—46 |

GERALD A. DOST, *Primary Examiner.*

U.S. Cl. X.R.

241—46, 192, 240, 290